Dec. 30, 1924.
E. S. HALL
PRESSURE VESSEL
Filed Nov. 22, 1923
1,521,093
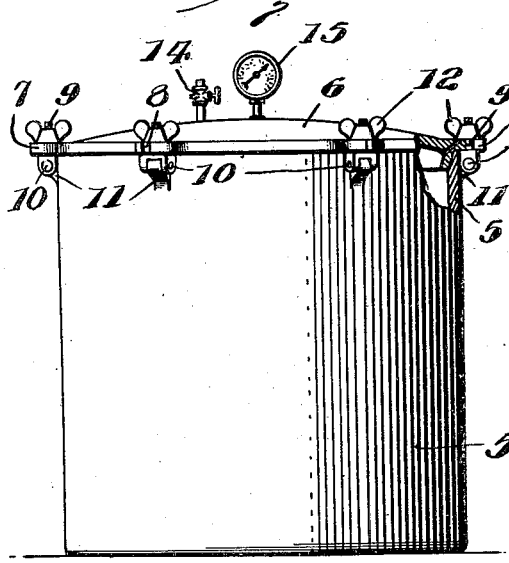
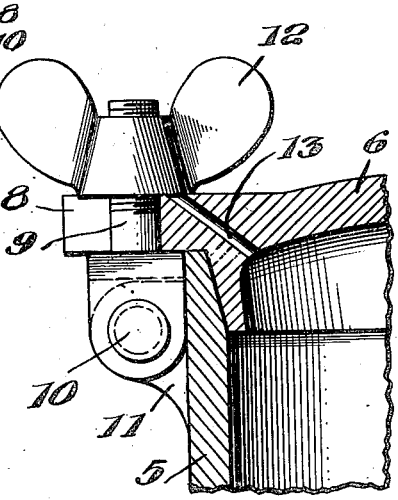
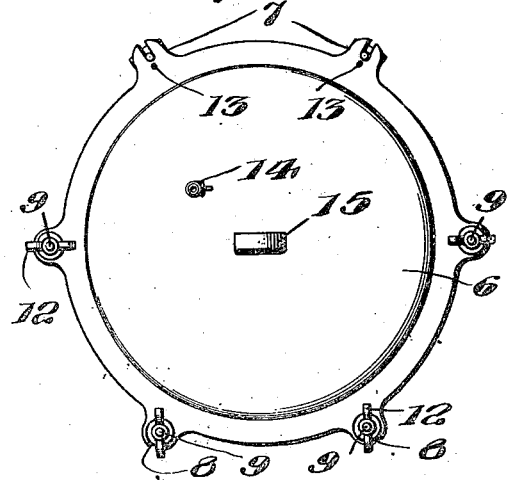
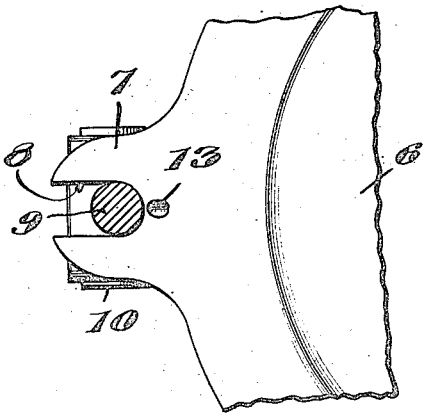
Inventor
E. S. Hall,
By Milo B. Stevens Co.
Attorney Patented Dec. 30, 1924.

1,521,093

UNITED STATES PATENT OFFICE.

EDWIN SYDNEY HALL, OF DENVER, COLORADO.

PRESSURE VESSEL.

Application filed November 22, 1923. Serial No. 676,409.

*To all whom it may concern:*

Be it known that I, EDWIN SYDNEY HALL, a citizen of the United States, residing at Denver, in the county of Denver and State of Colorado, have invented new and useful Improvements in Pressure Vessels, of which the following is a specification.

My invention relates to fluid pressure containers, and more particularly to such as fall within the class of steam pressure cookers.

Steam pressure cookers of the class most generally used, are provided with a lid embodying clamp receiving portions, whereby the lid may be removed to gain access to the contents of the vessel. A gage and steam outlet petcock is provided in connection with the vessel or cover, the petcock being employed to permit the escape of steam pressure preparatory to removing the lid. In using vessels of this character, the operator runs considerable chance of being burned or scalded in the event that he or she forgets to let the steam pressure off before removing the lid. It is, therefore, the primary object of my invention to provide a novel and improved safety device whereby the operator will be immediately apprised of the failure to release the steam pressure at the moment an attempt is made to release the lid clamping means.

A further object of the invention is the provision of an improved safety device of this character which will be adaptable to pressure vessels generally with but very slight modification thereof, which modification may be inexpensively made without necessitating special dies or in any way materially increasing the cost of production.

The various features of novelty which characterize my invention are pointed out with particularity in the claims annexed to and forming a part of this specification. For a better understanding of the invention, however, and the advantages possessed by it, reference should be had to the accompanying drawing and descriptive matter in which I have illustrated and described what I now regard as the preferred embodiment of my invention.

In the drawing,

Figure 1 is an elevation partly broken and partly in section of a pressure cooking vessel modified in accordance with my invention;

Fig. 2 is a plan view thereof;

Fig. 3 is an enlarged sectional detail of a fragment of the vessel, and

Fig. 4 is a similar view in plan, and partly in section.

Referring specifically to the drawing, wherein like reference characters have been used to designate like parts throughout, numeral 5 denotes the cooking vessel which is provided with a cover 6, the same being clamped to the vessel by means of integral lid projections 7 which are slotted as shown at 8. Bolts 9 are hinged to lugs 11 carried by the vessel, the hinged connection being indicated at 10. Wing nuts or other suitable nuts carried by the bolts 9 serve to clamp against the projections 7 to hold the lid in place.

I provide the lid 6 with a plurality of oblique ducts 13 which lead toward the projections 7 and have their outlets in the upper surface thereof at the points where the nuts 12 seat but spaced from the inner termination of the slots 8. Thus it will be apparent that if one of the nuts 12 is but slightly loosened preparatory to freeing the lid 6, steam from the vessel will escape through one of the ducts 13 and immediately apprise the operator of the fact that he has neglected to permit the head of steam within the vessel to escape through the petcock 14.

As hereinbefore stated, the preferred embodiment of the invention is illustrated in accordance with the patent statutes, but since various changes and modifications thereof will immediately suggest themselves to those skilled in the art without departing from my invention, I reserve the right to make such changes as fairly fall within the spirit and scope of the subject matter as claimed hereinafter.

What I claim as new and desire to secure by Letters Patent is:

1. The combination with a vessel having a cover and a clamping connection between said vessel and cover; said cover having a transverse port and said clamping connection when in clamping position being adapted to seal said port.

2. The combination with a vessel having a cover and a clamping connection between said vessel and cover; of said cover having a transverse port and said clamping connection when in clamping position being adapted to seal said port.

3. The combination with a closed vessel having an atmosphere communicating port and comprising separable sections; of clamping means for said sections movable to seal said port when in clamping position.

4. The combination with a closed vessel having an atmosphere communicating port and comprising separable sections; of clamping means for said sections movable to seal said port when in clamping position, said clamping means comprising a bolt and a port closing nut receivable thereon.

5. The combination with a vessel and its lid; of aligned bolt-receiving lugs carried by said vessel and lid clamping bolts passing through said lugs, said lid having atmosphere communicating ports leading therethrough adjacent said lugs, and clamping nuts carried by said bolts for closing said ports.

6. The combination with a vessel having a lid provided with integral slotted ears projecting from the same, pivoted bolts carried by said vessel and movable into the slots of said ears, and clamping nuts for said bolts, said lid having diagonal ducts therethrough and leading from said ears in proximity to said slots, and said clamping nuts when in clamping position being adapted to seal said ducts.

7. The combination with a closure having an atmosphere communicating vent; of a vessel attaching means for said closure, means for normally closing said vent when the attaching means is in operative position, and said vent closing means being released upon partial disengagement of said attaching means.

8. The combination with a vessel and its lid, a clamping connection being provided between the same; of said lid having an outlet port in the nature of a pressure signal, and said clamping connection when in clamping position serving to seal said port.

In testimony whereof I affix my signature.

EDWIN SYDNEY HALL.